(12) United States Patent
Cantor et al.

(10) Patent No.: US 11,001,446 B2
(45) Date of Patent: May 11, 2021

(54) APPARATUS, SYSTEMS, AND METHODS FOR PAYLOAD PICK-UP AND DROP-OFF WITH A SELF-DRIVING MATERIAL-TRANSPORT VEHICLE

(71) Applicant: Clearpath Robotics Inc., Kitchener (CA)

(72) Inventors: Daniel Cantor, Waterloo (CA); David William Bergsma, Brampton (CA); Kenneth James Sherk, Ayr (CA); Matthew Kingston Bedard, Cambridge (CA); Matthew Allen Rendall, Waterloo (CA); Ryan Christopher Gariepy, Kitchener (CA)

(73) Assignee: Clearpath Robotics Inc., Kitchener (CA)

( * ) Notice: Subject to any disclaimer, the term of this patent is extended or adjusted under 35 U.S.C. 154(b) by 95 days.

(21) Appl. No.: 16/118,594

(22) Filed: Aug. 31, 2018

(65) Prior Publication Data
US 2019/0062057 A1    Feb. 28, 2019

Related U.S. Application Data

(60) Provisional application No. 62/552,725, filed on Aug. 31, 2017.

(51) Int. Cl.
*B65G 1/137* (2006.01)
*G05B 19/05* (2006.01)
(Continued)

(52) U.S. Cl.
CPC ..... *B65G 1/1373* (2013.01); *G05B 19/41895* (2013.01); *G05D 1/0088* (2013.01);
(Continued)

(58) Field of Classification Search
CPC .. B65G 1/1373; G05D 1/0291; G05D 1/0088; G05D 1/0297; G05D 2201/0216;
(Continued)

(56) References Cited

U.S. PATENT DOCUMENTS

| 5,023,790 A | 6/1991 | Luke, Jr. |
| 6,315,513 B1 | 11/2001 | Harukawa et al. |

(Continued)

FOREIGN PATENT DOCUMENTS

WO    2011146259 A2    11/2011

OTHER PUBLICATIONS

Wikipedia Vehicular Automation, https://web.archive.org/web/20140402022211/https://en.wikipedia.org/wiki/vehicular_automation, retrieved by Archive.org on Apr. 2, 2014 (Year: 2014) (3 pages).

(Continued)

*Primary Examiner* — Michael Collins
(74) *Attorney, Agent, or Firm* — Bereskin & Parr LLP/S.E.N.C.R.L., s.r.l.

(57) ABSTRACT

Apparatus, systems and methods for providing smart pick-up and drop-off are presented. The apparatus comprises at least one vertical support member and at least one storage shelf supported by the at least one vertical support member. A payload transfer surface, supported by the vertical support members, is located below the lowest storage shelf. The payload transfer surface has an access channel so that a self-driving material-transport vehicle equipped with a lift appliance can pick up or drop off a payload on the payload transfer surface. A sensor associated with the payload transfer surface senses the presence or absence of a payload on the payload transfer surface, and sends a signal to a fleet-management system in communication with the self-driving material-transport vehicle.

20 Claims, 5 Drawing Sheets

(51) Int. Cl.
  *G05D 1/00* (2006.01)
  *G05D 1/02* (2020.01)
  *G05B 19/418* (2006.01)

(52) U.S. Cl.
  CPC ......... *G05D 1/0291* (2013.01); *G05D 1/0297* (2013.01); *G05B 19/05* (2013.01); *G05B 2219/15038* (2013.01); *G05D 2201/0216* (2013.01)

(58) Field of Classification Search
  CPC .............. G05B 19/41895; G05B 19/05; G05B 2219/15038
  USPC .................................................. 700/213–230
  See application file for complete search history.

(56) References Cited

U.S. PATENT DOCUMENTS

| | | | |
|---|---|---|---|
| 6,463,360 | B1 | 10/2002 | Terada et al. |
| 7,693,757 | B2 | 4/2010 | Zimmerman |
| 8,190,295 | B1 | 5/2012 | Garretson et al. |
| 8,634,981 | B1 | 1/2014 | Hyde et al. |
| 8,694,193 | B2 | 4/2014 | Makela et al. |
| 9,280,153 | B1 | 3/2016 | Palamarchuk et al. |
| 9,465,388 | B1 | 10/2016 | Fairfield et al. |
| 9,486,917 | B2 | 11/2016 | Reid et al. |
| 9,487,356 | B1 | 11/2016 | Aggarwal |
| 9,632,502 | B1 | 4/2017 | Levinson et al. |
| 9,928,749 | B2 * | 3/2018 | Gil .............................. B64F 1/32 |
| RE47,108 | E | 10/2018 | Jacobus et al. |
| 10,112,771 | B2 | 10/2018 | D'Andrea et al. |
| 10,317,119 | B2 * | 6/2019 | Zou ........................ G06Q 10/08 |
| 10,328,769 | B2 * | 6/2019 | Ferguson ............. G05D 1/0295 |
| 10,577,199 | B2 * | 3/2020 | Lee .......................... A47L 9/009 |
| 2002/0154974 | A1 * | 10/2002 | Fukuda ............. H01L 21/67294 414/416.01 |
| 2004/0158355 | A1 | 8/2004 | Holmqvist et al. |
| 2007/0106306 | A1 | 5/2007 | Bodduluri |
| 2007/0294029 | A1 * | 12/2007 | D'Andrea ............ G05D 1/0246 701/410 |
| 2008/0183599 | A1 * | 7/2008 | Hill ........................ G06Q 99/00 705/28 |
| 2009/0012667 | A1 | 1/2009 | Matsumoto et al. |
| 2009/0043440 | A1 | 2/2009 | Matsukawa et al. |
| 2010/0021272 | A1 | 1/2010 | Ward et al. |
| 2010/0030417 | A1 | 2/2010 | Fang et al. |
| 2010/0030466 | A1 * | 2/2010 | Rogers ...................... G08G 1/20 701/533 |
| 2010/0106356 | A1 | 4/2010 | Trepagnier et al. |
| 2010/0316470 | A1 | 12/2010 | Lert et al. |
| 2012/0197464 | A1 | 8/2012 | Wang et al. |
| 2012/0296471 | A1 | 11/2012 | Inaba et al. |
| 2013/0054133 | A1 | 2/2013 | Lewis et al. |
| 2013/0086215 | A1 | 4/2013 | Trotta et al. |
| 2013/0226340 | A1 | 8/2013 | Buchstab |
| 2013/0231779 | A1 | 9/2013 | Purkayastha et al. |
| 2014/0040431 | A1 * | 2/2014 | Rao ...................... G06F 16/2282 709/219 |
| 2014/0244004 | A1 | 8/2014 | Scott et al. |
| 2014/0309833 | A1 | 10/2014 | Ferguson et al. |
| 2015/0217455 | A1 | 8/2015 | Kikkeri et al. |
| 2015/0248131 | A1 | 9/2015 | Fairfield et al. |
| 2016/0086494 | A1 * | 3/2016 | Anandayuvaraj .... G08G 5/0026 701/3 |
| 2016/0101940 | A1 | 4/2016 | Grinnell et al. |
| 2016/0246301 | A1 | 8/2016 | Kazama et al. |
| 2016/0271800 | A1 | 9/2016 | Stubbs et al. |
| 2016/0327951 | A1 | 11/2016 | Walton et al. |
| 2017/0039765 | A1 | 2/2017 | Zhou et al. |
| 2017/0113352 | A1 | 4/2017 | Lutz et al. |
| 2020/0206928 | A1 | 7/2020 | Denenberg et al. |

OTHER PUBLICATIONS http://www.digitalglobe.com/downloaded on May 6, 2014 (3 pages).
Final Office Action and Notice of References Cited dated Mar. 16, 2021 in related U.S. Appl. No. 16/176,674 (27 pages).

\* cited by examiner

APPARATUS, SYSTEMS, AND METHODS FOR PAYLOAD PICK-UP AND DROP-OFF WITH A SELF-DRIVING MATERIAL-TRANSPORT VEHICLE

CROSS-REFERENCE TO RELATED APPLICATIONS

This application claims priority from U.S. Provisional Patent Application No. 62/552,725, filed 31 Aug. 2017, and titled "APPARATUS, SYSTEMS, AND METHODS FOR PAYLOAD PICK-UP AND DROP-FF WITH A SELF-DRIVING MATERIAL-TRANSPORT VEHICLE", the contents of which are incorporated herein by reference for all purposes.

TECHNICAL FIELD

The described embodiments relate to systems and methods for picking up and dropping off a payload within an industrial facility, and in particular, to a pick-up-and-drop-off stand.

BACKGROUND

Self-driving material-transport vehicles are used to move payloads such as parts and inventory throughout industrial facilities such as factories and warehouses. As such, it is necessary to load payloads onto material-transport vehicles, and unload them from material-transport vehicles. While some material-transport vehicles such as fork lifts and pallet jacks may be equipped to lift a pallet directly off a floor, other material-transport vehicles are not similarly equipped. In these cases, an apparatus may be used to hold the payload in order to facility loading and unloading of the payload.

However, the addition of a new apparatus often creates problems for managers and operators of industrial facilities. For example, floor space in an industrial facility such as factories and warehouses is often considered scarce, and the efficient allocation of floor space is highly valued.

Furthermore conventional approaches to providing apparatus for holding a payload require some degree of human intervention. For example, human intervention may be required to identify when a payload has been loaded or unloaded from the apparatus.

SUMMARY

In a first aspect, there is an apparatus for providing smart pick-up and drop-off. The apparatus comprises at least one vertical support member and at least one storage shelf supported by the at least one vertical support member. A payload transfer surface is also supported by the at least one vertical support member, and is located below the at least one storage shelf. The payload transfer surface has an access channel. A sensor associated with the payload transfer surface is used to sense the presence or absence of a payload on the payload transfer surface, and a communications sensor communicates a signal from the sensor. When the payload is present on the payload transfer surface, the signal indicates the presence of the payload, and when the payload is not present on the payload transfer surface, the signal indicates that the payload transfer surface is empty.

According to some embodiments, the access channel extends across the entire payload surface thereby defining two payload transfer surface sections.

According to some embodiments, each payload transfer surface section comprises a ballast.

According to some embodiments, the sensor is a limit switch or proximity sensor.

According to some embodiments, the communications transceiver is configured to communicate with a programmable logic controller.

According to some embodiments, the apparatus further comprises at least one second sensor associated with the payload transfer surface.

In a second aspect, there is a system for providing smart pick-up and drop-off. The system comprises a payload transfer surface supported by at least one vertical support member and a sensor associated with the payload transfer surface for sensing the presence or absence of a payload on the payload transfer surface. The system further comprises a fleet-management system in communication with the sensor for managing a fleet of self-driving vehicles, and at least one self-driving material-transport vehicle in communication with the fleet-management system. The sensor communicates a signal to the fleet-management system that indicates the presence or absence of the payload and the fleet-management system sends instructions to the vehicle based on the signal.

According to some embodiments, the system further comprises a storage shelf supported by the at least one vertical support member, located above the payload transfer surface.

According to some embodiments the self-driving material-transport vehicle comprises a lift appliance for elevating the payload, and the payload transfer surface comprises an access channel for accommodating the lift appliance.

According to some embodiments, the system comprises at least one second sensor associated with the payload surface.

According to some embodiments, the system further comprises a communications transceiver in communication with the sensor and the second sensor. The sensor and the second sensor are used to generate a signal indicative of the presence and the type of the payload, and the communications transceiver transmits the signal.

In a third aspect, there is a method for providing smart pick-up and drop-off. The method comprises sensing a presence or absence of a payload on a payload transfer surface using a sensor associated with the payload transfer surface. A fleet-management system receives a signal based on the sensed presence or absence of the payload on the payload transfer surface. Instructions are automatically provided to a self-driving material-transport vehicle with the fleet-management system, based on the signal.

According to some embodiments, the method further comprises autonomously driving the vehicle to the payload transfer surface based on the instructions.

According to some embodiments, the signal indicates the presence of the payload on the payload surface. The method further comprises, based on the instructions, autonomously positioning the vehicle under the payload transfer surface. A left appliance on the vehicle is then elevated through an access channel of the payload transfer surface such that the payload is elevated above the payload transfer surface. Then, the vehicle autonomously drives to a first distance from the payload transfer surface and lowers the lift appliance on the vehicle to a travel height. The vehicle then autonomously drives to a destination such that the payload is transported from the payload transfer surface to the destination location.

According to some embodiments, the payload is on the vehicle, and the signal indicates the absence of the payload on the payload transfer surface. The method further comprises autonomously driving the vehicle to a first distance from the payload transfer surface and elevating a lift appliance on the vehicle such that the payload is elevated to a height above the payload transfer surface. The vehicle then autonomously drives to the payload transfer surface such that the lift appliance enters an access channel of the payload transfer surface. Then, the lift appliance on the vehicle is lowered such that the payload is placed on the payload transfer surface, and the vehicle autonomously drives away from the payload transfer surface.

BRIEF DESCRIPTION OF THE DRAWINGS

A preferred embodiment of the present invention will now be described in detail with reference to the drawings, in which.

DETAILED DESCRIPTION

Figure 1:
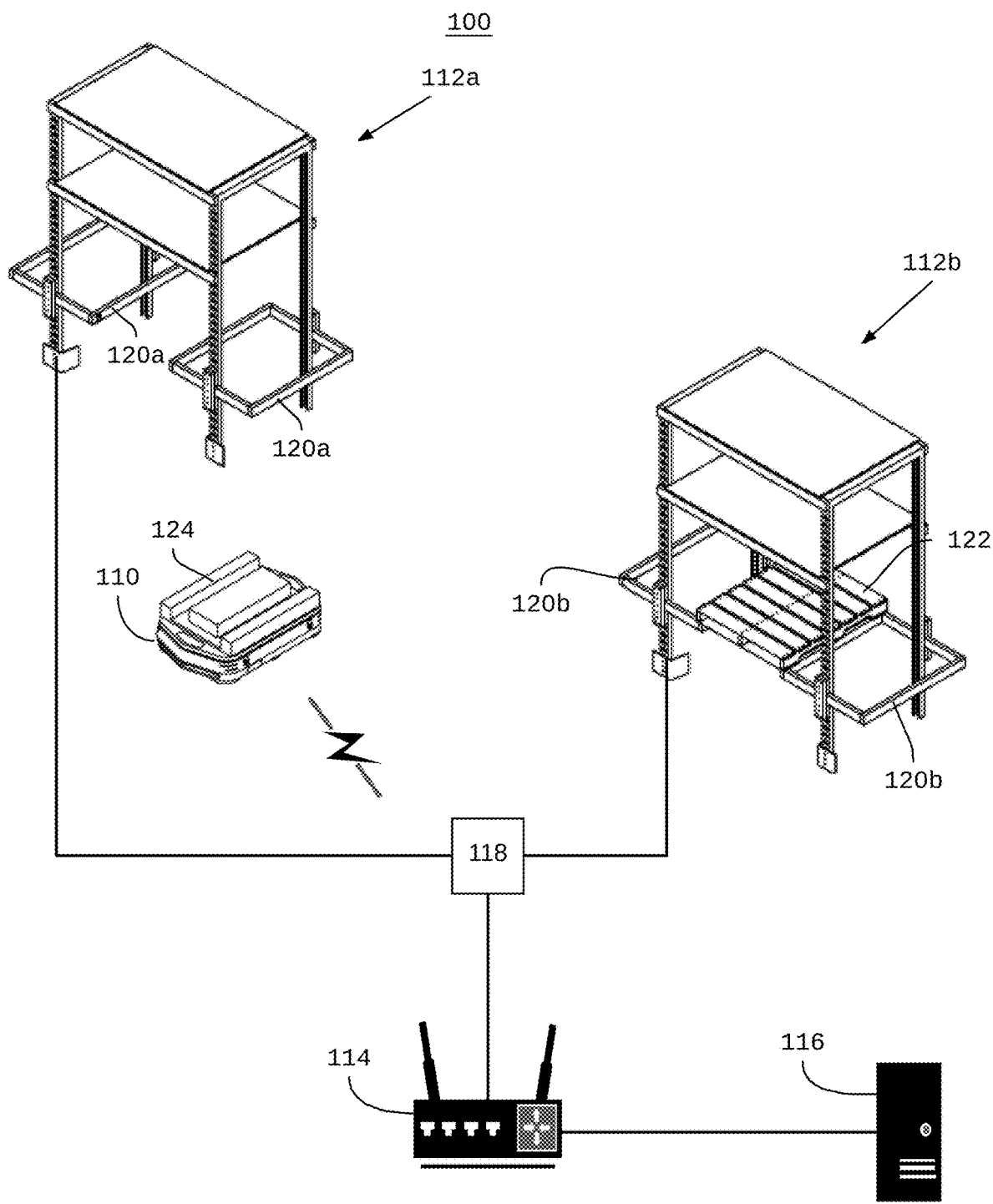
FIG. 1 is a network diagram of a system for instructing self-driving material-transport vehicles according to some embodiments.

Referring to FIG. 1, there is shown a system 100 for picking up and dropping off a payload with self-driving material-transport vehicles. The system includes a self-driving material-transport vehicle 110 and smart pick-up-and-drop-off shelving unit 112a.

The system may also include communication networking equipment 114 such as wireless and wired networking equipment, and computing equipment 116 such as a server or computer terminal. According to some embodiments, a programmable logic controller ("PLC") 118 may be included, for example, as a part of the industrial process equipment within a facility that may be controlled with an industrial control system.

The networking equipment 114 generally enables communications between the vehicle 110, the smart pick-up-and-drop-off shelves 112a and 112b (collectively referred to as the smart pick-up-and-drop-off shelves 112) and the computer 116 and the computer server 118 may be in communication with the communications network, via a wired connection or wirelessly via a wireless access point that is generally part of the networking equipment 114.

According to some embodiments, the vehicle 110 may be one of a plurality of vehicles, for example, a fleet of vehicles, and the fleet of vehicles may be in communication with a fleet-management system running on the computer 116.

According to some embodiments, the computer 116 may be a part of an industrial control system. For example, the computer 116 may be used, in part, as a SCADA system that provides an interface for a human user to monitor and control field instruments, PLCs (e.g. PLC 118), and other industrial control equipment in order to monitor and control an industrial process. According to some embodiments, the computer 116 may be a part of a fleet-management system that communicates with a fleet of vehicles (including the vehicle 110), for example, in order to provide information to or receive information from the vehicles, including the distribution of missions to the vehicles. According to some embodiments, more than one computer 116 may be used to provide any or all of an industrial control system and a fleet-management system.

The smart pick-up-and-drop-off shelves 112 generally include a sensor for generating an activation signal according to conditions sensed on or in proximity to a payload transfer surface 120 (individually labelled as payload transfer surfaces 120a and 120b). In the example shown in FIG. 1, the shelves 112 may include a sensor or switch such as a proximity sensor or limit switch for determining whether a payload, such as a pallet 122 is present on the payload transfer surface. As shown, the smart pick-up-and-drop-off shelving unit 112b holds a pallet 122, whereas the smart pick-up-and-drop-off shelving unit 112a does not. According to some embodiments, the vehicle 110 may include a lift appliance 124 for lifting a payload (e.g. the pallet 122) on to or off the payload transfer surface 120.

According to some embodiments, a smart pick-up-and-drop-off shelving unit 112 may include a communications transceiver for communicating with the PLC 118 and/or the networking equipment 114. For example, a signal may be sent from the smart pick-up-and-drop-off shelving unit 112 in response to a change in the presence of a payload, which may be communicated to any or all of an industrial control system and a fleet-management system running on the computer 116.

Figure 2:
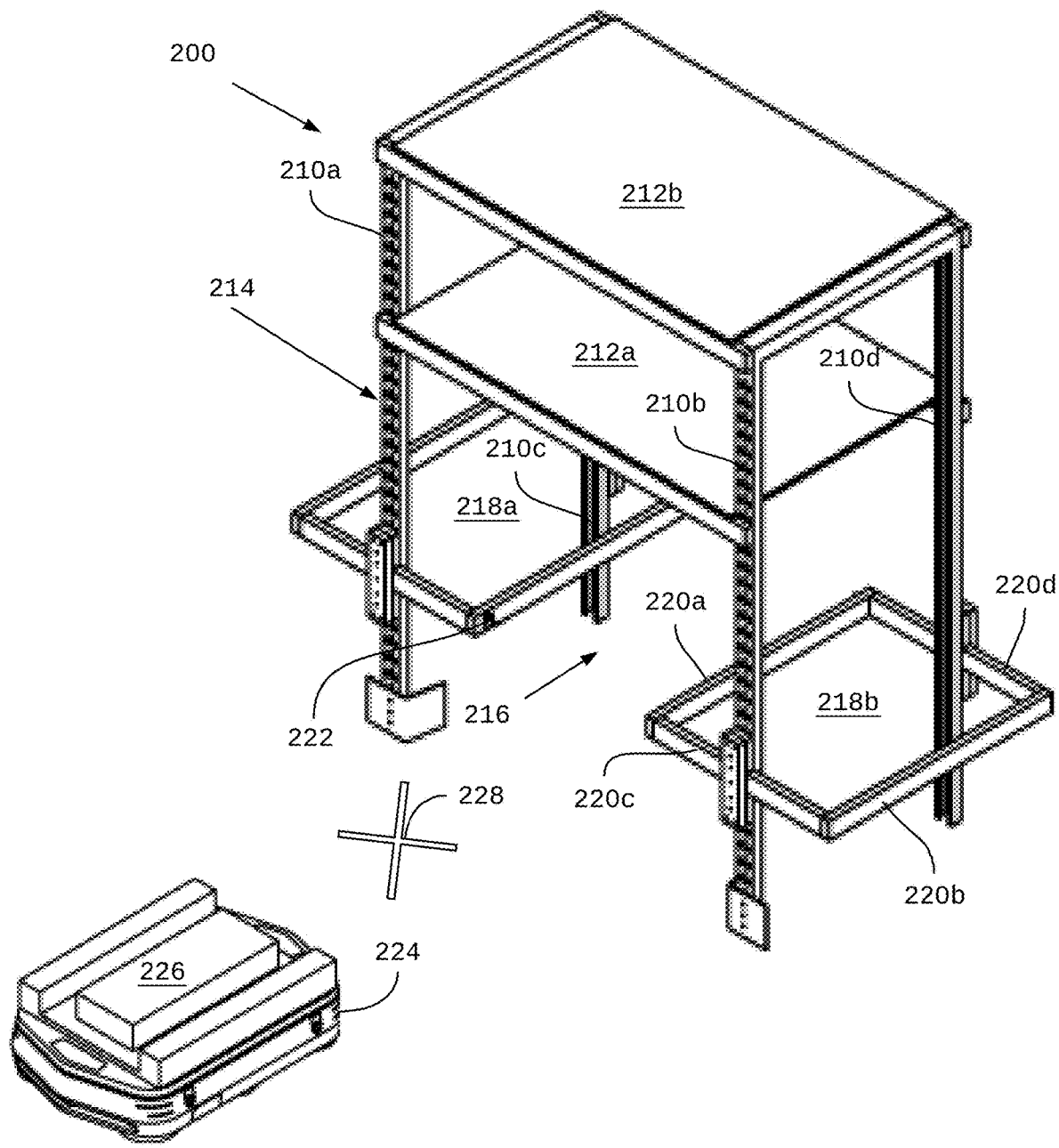
FIG. 2 is an isometric view of a self-driving material-transport vehicle and a storage shelf that includes a smart pick-up-and-drop-off stand according to some embodiments.

Referring to FIG. 2, there is shown a smart pick-up-and-drop-off shelving unit 200 according to some embodiments. The shelf 200 generally comprises two or more vertical support members, and, in the example shown, comprises vertical support members 212a, 212b, 212c, and 212d (collectively referred to as the vertical support members 212).

One or more storage shelves may be attached to the vertical members 210. In the example shown, two shelves 212a and 212b (collectively referred to as the shelves 212) are attached to the vertical members 210. Any number of shelves 212 may be attached to the vertical support members.

A payload transfer surface 214 is supported by the vertical members 210, and is located below the lowest storage shelf 212a. According to some embodiments, the inclusion of multiple storage shelves 212 and a payload transfer surface 214 allows for the efficient use of space within an industrial facility, by making efficient use of the vertical space for storage above the payload transfer surface 214, thereby making floor space available that would otherwise be occupied by a pick-up-and-drop-off stand within the shelves 212.

In the example of FIG. 2a, the payload transfer surface 214 is shown without a payload. An access channel 216 is provided within the payload transfer surface 214, thereby defining a first payload transfer surface section 218a and a second payload transfer surface section 218b, collectively referred to as the payload transfer surface sections 218.

According to some embodiments, the payload transfer surface sections 218 may comprise a solid structure similar to a shelf. According to some embodiments, such as is shown in FIG. 2, the structure of the payload transfer surface sections 218, for example the payload transfer surface section 218b may be provided by horizontal members 220a, 220b, 220c, and 220d around the perimeter of the payload transfer surface section 218b such that the surface within the perimeter is open (e.g. does not comprise a solid structure).

As used herein, the term "payload transfer surface" refers to the generally horizontal surface defined by the payload transfer surface sections and the access channel 216, upon which a payload can be placed. According to some embodiments, the payload transfer surface 214 may support a payload by using the horizontal member 220a as a payload-bearing member, in concert with the opposite payload-bearing member, not labelled, that comprises the payload transfer surface section 218a. Thus, even though the entire horizontal plane is referred to as the payload transfer surface 214, according to some embodiments, the payload may be supported by two or more horizontal members.

According to some embodiments, the horizontal member 220b may be used a ballast, which may be placed on the other side of the vertical support members 210b and 210d as the payload-bearing member 220a, such that horizontal members 220c and 220d are used as cantilevers.

The smart pick-up-and-drop-off shelving unit 200 includes a sensor or switch 222 such as a proximity sensor or limit switch. The sensor or switch 222 detects the presence or absence of a payload on the payload transfer surface 214. According to some embodiments, the sensor or switch 222 may detect any or all of a change in the presence or absence of the payload and the current state in the presence or absence of the payload. According to some embodiments, the smart pick-up-and-drop-off shelving unit 200 may include a communications transceiver (not shown) for sending a signal based on the sensor or switch 222. According to some embodiments, there may be more than one sensor or switch 222 in order to provide redundancy or to detect different form factors of payload.

The smart pick-up-and-drop-off shelving unit 200 enables an autonomous self-driving material-transport vehicle 224 to pick up and/or drop off a payload on the payload transfer surface 214. According to some embodiments, the vehicle 224 is equipped with a lift appliance 226. The lift appliance 226 is used to carry a payload on the vehicle 224 while the vehicle 224 is travelling. The lift appliance 226 may be raised or lowered so that the lift appliance 226 and/or a payload are elevated above the height of the payload transfer surface 214. According to some embodiments, either or both of the lift appliance 226 and the access channel 216 may be selected in order to have complementary dimensions. In other words, the width of the lift appliance 226 fits within the access channel 216 when the lift appliance 226 is in an elevated position.

In the case of a pick-up operation, a payload has previously been placed on the payload transfer surface 214. According to the embodiments of FIG. 2, this means that the payload is wider than the access channel 216 such that the payload is supported by the payload-bearing members (e.g. horizontal member 220a).

In order to perform the pick-up operation, the vehicle 224 drives under the payload transfer surface 214 with the lift appliance 226 lowered so that the lift appliance 226 is positioned under the access channel 216. Once positioned, the lift appliance 226 is raised through the access channel 216 until it engages with the payload and elevated the payload above the payload transfer surface 214 (i.e. off of the payload-bearing members).

Once the lift appliance 226 has elevated the payload off of the payload transfer surface 214, the vehicle 224 drives out of the access channel 216. According to some embodiments, when the vehicle 224 has travelled to a payload-lift point 228, as marked by a cross in FIG. 2, the lift appliance 226 is lowered and the vehicle 224 continues to travel to a destination location for delivery of the payload.

In order to perform a drop-off operation, the vehicle drives with a payload on the lift appliance 226 and the lift appliance 226 in a lowered position for transporting the payload from its original location. The drop-off operation is similar to the pick-up operation, but with the order of the steps reversed. When the vehicle 226 is at the payload-lift point 228, the lift is raised so that the payload is elevated above the payload transfer surface 214. With the lift raised, the vehicle 226 drives into the access channel 216. Once the vehicle 226 is positioned within the access channel 216, the lift appliance is lowered, and the payload is placed on the payload transfer surface 214.

According to some embodiments, the payload-lift point 228 may be defined based on a particular distance from the smart pick-up-and-drop-off shelving unit 200. According to some embodiments, the payload-lift point 228 may be a particular point specified in the vehicle's mission, and defined relative to an electronic map of the facility. According to some embodiments, the vehicle 26 may stop at the payload-lift point 228 while the lift appliance 226 is being raised or lowered. According to some embodiments, the lift appliance 226 may be raised or lowered while the vehicle 226 is moving in general proximity of the payload-lift point 228.

Figure 3:
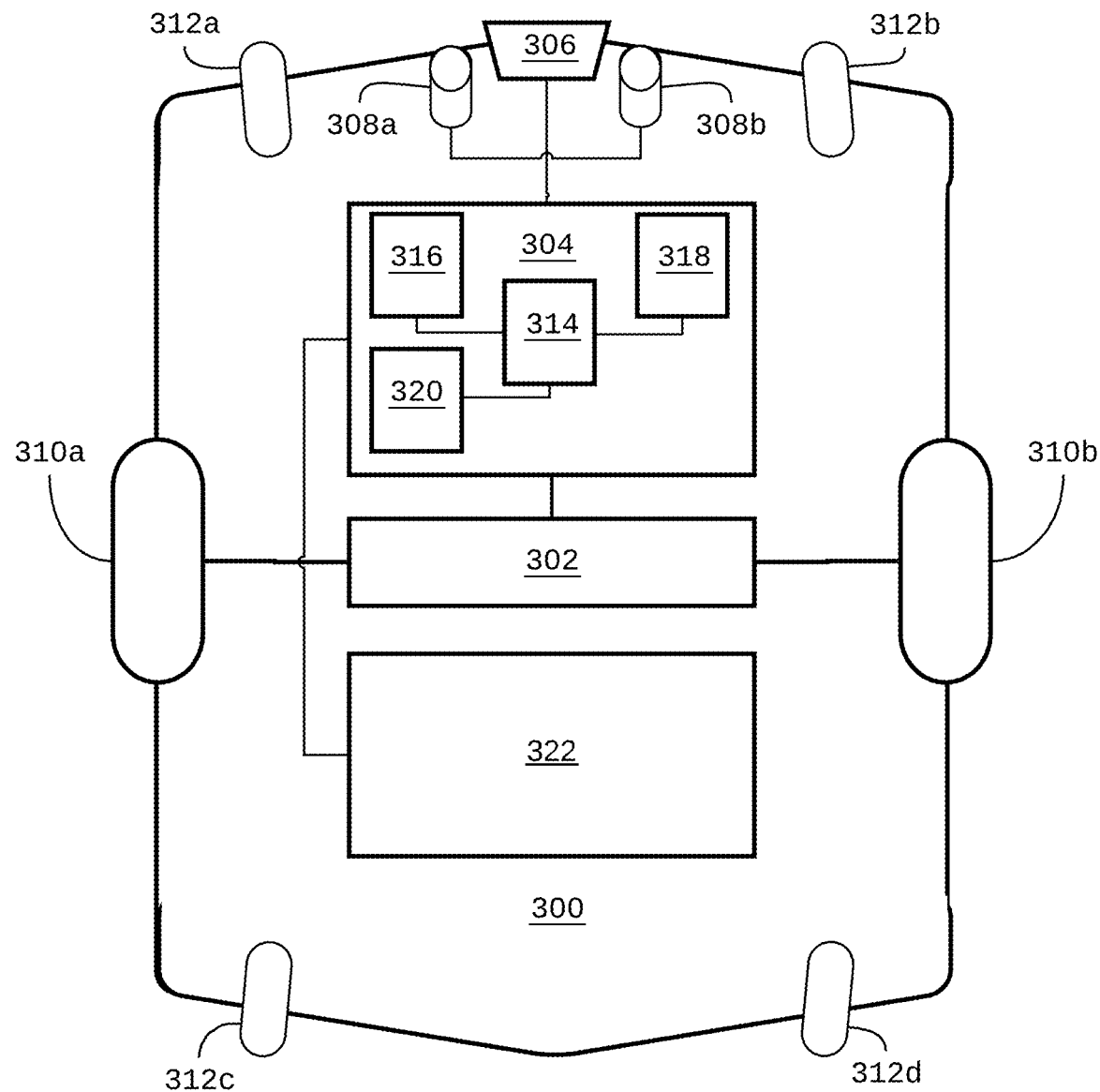
FIG. 3 is a system diagram of a self-driving material-transport vehicle including a lift appliance, according to some embodiments.

Referring to FIG. 3, there is shown a self-driving material-transport vehicle 300 according to some embodiments. The vehicle comprises a drive system 302, a vehicle control system 304, one or more sensors 306, 308a, and 308b, and a lift appliance 322.

The drive system 302 includes a motor and/or brakes connected to drive wheels 310a and 310b for driving the vehicle 300. According to some embodiments, the motor may be an electric motor, combustion engine, or a combination/hybrid thereof. Depending on the particular embodiment, the drive system 302 may also include control interfaces that can be used for controlling the drive system 302. For example, the drive system 302 may be controlled to drive the drive wheel 310a at a different speed than the drive wheel 310b in order to turn the vehicle 300. Different embodiments may use different numbers of drive wheels, such as two, three, four, etc.

According to some embodiments, additional wheels 312 may be included (as shown in FIG. 3, the wheels 312a, 312b, 312c, and 312d may be collectively referred to as the wheels 312). Any or all of the additional wheels 312 may be wheels that are capable of allowing the vehicle 300 to turn, such as castors, omni-directional wheels, and mecanum wheels.

The vehicle control system 304 comprises a processor 314, a memory 316, a computer-readable non-transitory medium 318, and a communications transceiver 120, such as a wireless transceiver for communicating with a wireless communications network (e.g. using an IEEE 802.11 protocol or similar, also known as "WiFi").

One or more sensors 306, 308a, and 308b may be included in the vehicle 300. For example, according to some embodiments, the sensor 306 may be a LiDAR device (or other optical/laser, sonar, or radar range-finding sensor). The sensors 308a and 308b may be optical sensors, such as video cameras. According to some embodiments, the sensors 308a and 308b may be optical sensors arranged as a pair in order to provide three-dimensional (e.g. binocular or RGB-D) imaging.

The vehicle control system 304 uses the medium 318 to store computer programs that are executable by the processor 314 (e.g. using the memory 316) so that the vehicle control system 304 can provide automated or autonomous operation to the vehicle 300. Furthermore, the vehicle control system 304 may also store an electronic map that represents the known environment of the vehicle 300, such as a manufacturing facility, in the media 318.

For example, the vehicle control system 304 may plan a path for the vehicle 300 based on a known destination location and the known location of the vehicle. Based on the planned path, the vehicle control system 304 may control the drive system 302 in order to drive the vehicle 300 along the planned path. As the vehicle 300 is driven along the planned path, the sensors 306, and/or 308a and 308b may update the vehicle control system 304 with new images of the vehicle's environment, thereby tracking the vehicle's progress along the planned path and updating the vehicle's location. In other embodiments, the vehicle control system 304 may rely in part or in whole on a user-defined path.

Since the vehicle control system 304 receives updated images of the vehicle's environment, and since the vehicle control system 304 is able to autonomously plan the vehicle's path and control the drive system 302, the vehicle control system 304 is able to determine when there is an obstacle in the vehicle's path, plan a new path around the obstacle, and then drive the vehicle 300 around the obstacle according to the new path.

According to some embodiments, the vehicle control system 304 may additionally provide a computer server. For example, the processor 314, the memory 316, the medium 318, and the communications transceiver 120 may be configured in order to provide a web server (e.g. using HTTP) which may be made available on a local-area network (LAN), wide-area network (WAN, or over the Internet. The server may be configured to provide components of the systems and methods described herein, such as for providing vehicle information to a monitoring device.

A lift appliance 322 may be attached to the vehicle 300, and may be in communication with the vehicle control system 304. The lift appliance generally includes a lift or elevator mechanism, such as a mechanism comprising any or all of a scissor lift, lead-screw, rack and pinion, telescopic lift, etc., and a linear actuator such as a hydraulic cylinder, pneumatic cylinder, motor, etc. In some cases, the lift or elevator mechanism may combine extension and actuation features, such as a helical band actuator.

The lift appliance 322 may communicate with the vehicle control system 304 so that the lift appliance 322 can be operated (e.g. raised or lowered) in coordination with other movements of the vehicle 300. For example, when the vehicle 300 travels to a particular location and stops at the location, the lift or elevator mechanism of the lift appliance 322 may be automatically raised or lowered.

The lift appliance 322 may include a payload platform, such as at the top of the lift or elevator mechanism. A payload platform is generally used to transport a payload, such as a pallet, a container, or another type of item. According to some embodiments, the size and/or shape of the payload platform may be selected in order to complement (e.g. engage with) a pick-up and drop-off stand, for example in relation to the access channel 218.

Figure 4:
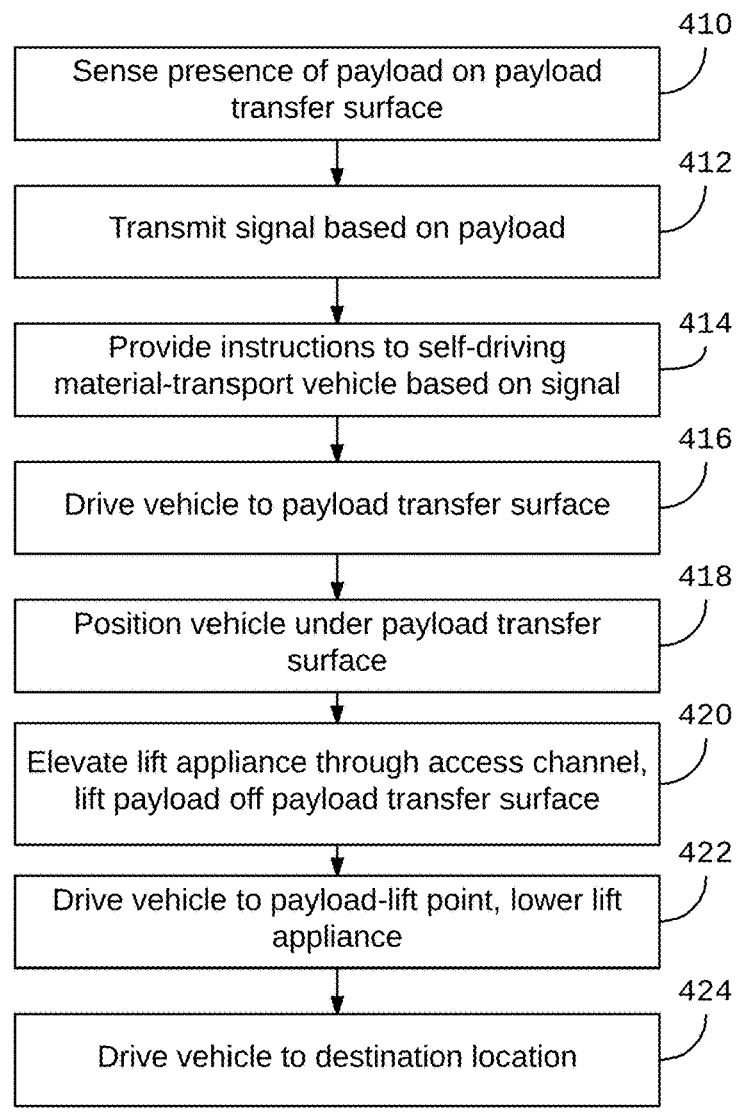
FIG. 4 is a flow diagram of a method for providing smart pick-up and drop-off, depicting a "pick-up operation" according to some embodiments.

Referring to FIG. 4, there is shown a method 400 for providing smart pick-up and drop-off, according to some embodiments. The method 400 may be implemented using one or more computer processors, such as those included in any or all of a self-driving material-transport vehicle, an industrial control system (e.g. on a computer terminal or server), and a fleet-management system (e.g. on a computer terminal or server). Non-transitory computer-readable media associated with one or more processors may store computer-readable instructions for configuring the one or more processors to execute the steps of the method 400.

The method 400 begins at step 410 when the presence or absence of a payload is sensed on the payload transfer surface. Generally, the same sensor or switch may detect both the presence or absence of the payload. For the sake of explanation, the method 400 is described in respect of sensing the presence of a payload on the payload transfer surface. As such, any or all of the steps of method 400 in FIG. 4 and the steps of the method 500 in FIG. 5 may be executed together as a single method.

According to some embodiments, a sensor or switch may detect the presence or absence of the payload, and/or a chance in the presence or absence of the payload. According to embodiments, the switch may be polled (e.g. via the communications transceiver) in order to determine the current state of the sensor or switch. For example, any or all of a fleet-management system, industrial control system, and PLC may poll (e.g. read from) the sensor or switch. According to some embodiments, the state of the sensor or switch, indicating the presence or absence of the payload, may be transmitted to any or all of a fleet-management system, industrial control system, and PLC.

At step 412, a signal is transmitted based on the state of the sensor or switch (i.e. based on the presence of the payload). According to some embodiments, the signal may be transmitted to any or all of the vehicle, fleet-management system, industrial control system, and PLC.

At step 414, instructions are provided to the vehicle based on the signal. According to some embodiments, the instructions may be in the form of a mission to be executed by the vehicle. According to some embodiments, the instructions may be provided to (and/or generated by) any or all of the vehicle, fleet-management system, industrial control system, and PLC. Generally, the instructions include instructions for the vehicle to pick up the payload from the payload transfer surface, and include, for example, the location of the payload transfer surface.

At step 416, the vehicle autonomously drives to the payload transfer surface. At step 418, the vehicle autonomously positions itself under the payload transfer surface. According to some embodiments, the vehicle autonomously positions itself so that the lift appliance is aligned with the access channel in the payload transfer surface.

At step 420, the lift appliance is elevated through the access channel so that the payload is lifted off the payload transfer surface.

At step 422, the vehicle drives away from the payload transfer surface, with the payload carried by the lift appliance, and the lift appliance in a raised position. When the vehicle is at or in proximity of a payload-lift point, the lift appliance is lowered to a transport position. According to some embodiments, the payload-lift point may be determined based on a distance from the payload transfer surface at which the payload is clear from hitting the payload transfer surface when the lift appliance lowers the payload. According to some embodiments, the vehicle may stop at the payload-lift point while the lift appliance is lowered. According to some embodiments, the vehicle may continue to drive while the lift appliance is lowered.

At step 424, the vehicle autonomously drives to the destination location associated with the payload (e.g. where the payload is to be delivered). According to some embodiments, the destination location may be provided along with the instructions during step 414, or at another time.

Figure 5:
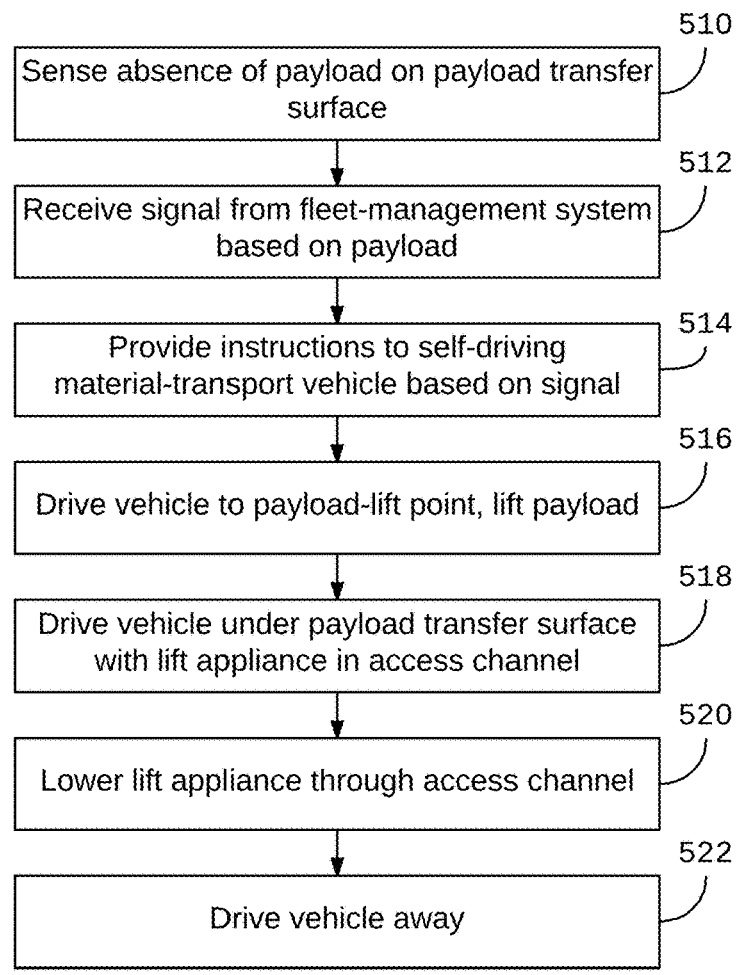
FIG. 5 is a flow diagram of a method for providing smart pick-up and drop-off, depicting a "drop-off operation" according to some embodiments.

Referring to FIG. 5, there is shown a method 500 for providing smart pick-up and drop-off, according to some embodiments. The method 500 may be implemented using one or more computer processors, such as those included in any or all of a self-driving material-transport vehicle, an industrial control system (e.g. on a computer terminal or server), and a fleet-management system (e.g. on a computer terminal or server). Non-transitory computer-readable media associated with one or more processors may store computer-readable instructions for configuring the one or more processors to execute the steps of the method 500.

The method 500 begins at step 510 when the presence or absence of a payload is sensed on the payload transfer surface. Generally, the same sensor or switch may detect both the presence or absence of the payload. For the sake of explanation, the method 500 is described in respect of sensing the absence of a payload on the payload transfer surface.

At step 512, a signal is transmitted based on the state of the sensor or switch (i.e. based on the absence of the payload). According to some embodiments, the signal may be transmitted to any or all of the vehicle, fleet-management system, industrial control system, and PLC.

At step 514, instructions are provided to the vehicle based on the signal. According to some embodiments, the instructions may be in the form of a mission to be executed by the vehicle. According to some embodiments, the instructions may be provided to (and/or generated by) any or all of the vehicle, fleet-management system, industrial control system, and PLC. Generally, the instructions include instructions for the vehicle to drop off the payload from the payload's original location on to the payload transfer surface, and include, for example, the location of the payload transfer surface.

At step 516, the vehicle autonomously drives towards the payload transfer surface. According to some embodiments, when the vehicle is at or around a payload-lift point, the payload is elevated to a height above the payload transfer surface by raising the lift mechanism.

At step 518, the vehicle autonomously drives under the payload surface. According to some embodiments, the vehicle autonomously positions itself so that the raised lift mechanism aligned for entry into the access channel.

At step 520, the lift appliance is lowered through the access channel so that the payload is left on the payload transfer surface.

At step 522, the vehicle autonomously drives away from the payload transfer surface.

The present invention has been described here by way of example only. Various modification and variations may be made to these exemplary embodiments without departing from the spirit and scope of the invention, which is limited only by the appended claims.

We claim:

1. A system for providing smart pick-up and drop-off, comprising:
   a payload transfer surface supported by at least one vertical support member, the payload transfer surface having an access channel;
   a sensor associated with the payload transfer surface for sensing a presence or absence of a payload on the payload transfer surface;
   a fleet-management system in communication with the sensor for managing a fleet of self-driving vehicles;
   at least one self-driving material-transport vehicle in communication with the fleet-management system, the vehicle having a lift appliance for elevating the payload;
   wherein, the sensor communicates a signal to the fleet-management system indicative of the presence or absence of the payload and the fleet-management system sends instructions to the vehicle based on the signal to autonomously drive the vehicle under the payload transfer surface and elevate the lift appliance so that the lift appliance is positioned within the access channel and the payload is elevated above the payload transfer surface.

2. The system of claim 1, further comprising a storage shelf supported by the at least one vertical support member and located above the payload transfer surface.

3. The system of claim 1, further comprising at least one second sensor associated with the payload transfer surface.

4. The system of claim 3, further comprising a communications transceiver in communication with the sensor and the at least one second sensor, wherein the sensor and the at least one second sensor communicate the signal via the communications transceiver, the signal being indicative of the presence and the type of payload.

5. The system of claim 4, wherein the communication transceiver is configured to communicate with a programmable logic controller.

6. The system of claim 3, wherein the sensor and the at least one second sensor detect different form factors of payload.

7. The system of claim 1, wherein the access channel extends across the entire payload transfer surface thereby defining two payload transfer surface sections.

8. The system of claim 7, further comprises a ballast on each payload transfer surface section.

9. The system of claim 7, wherein at least one of the two payload transfer surface section comprises one or more horizontal members defining a perimeter and an open area therein.

10. The system of claim 1, wherein the sensor comprises at least one of a limit switch and a proximity sensor.

11. The system of claim 1, wherein the fleet-management system operates to generate instructions for autonomously driving the vehicle to the payload transfer surface.

12. The system of claim 11, wherein when the signal indicates the presence of the payload on the payload transfer surface, the fleet-management system operates to generate instructions for:
   autonomously positioning the vehicle under the payload transfer surface;
   elevating the lift appliance on the vehicle through the access channel of the payload transfer surface such that the payload is elevated above the payload transfer surface;
   autonomously driving the vehicle to a first distance away from the payload transfer surface;
   lowering the lift appliance on the vehicle to a travel height;
   autonomously driving the vehicle to a destination location such that the payload is transported from the payload transfer surface to the destination location.

13. The system of claim 12, wherein the first distance away from the payload transfer surface is determined based on at least one of a detected proximity to the payload transfer surface or a point specified in the vehicle's mission, the point being defined relative to an electronic map.

14. The system of claim 12, wherein the lift appliance is lowered while the vehicle is autonomously driving.

15. The system of claim 11, wherein when the payload is on the vehicle and the signal indicates the absence of the payload on the payload transfer surface, the fleet-management system operates to generate instructions for:
- autonomously driving the vehicle to a first distance from the payload transfer surface;
- elevating the lift appliance on the vehicle such that the payload is elevated to a height above the payload transfer surface;
- autonomously driving the vehicle to the payload transfer surface such that the lift appliance enters the access channel of the payload transfer surface;
- lowering the lift appliance on the vehicle such that the payload is placed on the payload transfer surface; and
- autonomously driving the vehicle away from the payload transfer surface.

16. The system of claim 15, wherein the first distance from the payload transfer surface is determined based on at least one of a detected proximity to the payload transfer surface or a point specified in the vehicle's mission, the point being defined relative to an electronic map.

17. The system of claim 15, wherein the lift appliance is elevated while the vehicle is autonomously driving.

18. The system of claim 1, wherein the vehicle is autonomously positioned under the payload transfer surface prior to the lift appliance being elevated.

19. The system of claim 1, wherein the vehicle is autonomously positioned under the payload transfer surface subsequent to the lift appliance being elevated.

20. The system of claim 1, wherein the signal is indicative of a change in the presence or absence of the payload.

* * * * *